(12) United States Patent
Chen et al.

(10) Patent No.: US 12,145,212 B2
(45) Date of Patent: Nov. 19, 2024

(54) PRESSURE DETECTION ASSEMBLY AND ULTRASONIC WELDING DEVICE

(71) Applicant: GUANGDONG LYRIC ROBOT AUTOMATION CO., LTD., Huizhou (CN)

(72) Inventors: De Chen, Huizhou (CN); Qihui Lu, Huizhou (CN); Peng Fan, Huizhou (CN); Junxiong Zhou, Huizhou (CN); Yixian Du, Huizhou (CN)

(73) Assignee: GUANGDONG LYRIC ROBOT AUTOMATION CO., LTD., Huizhou (CN)

( * ) Notice: Subject to any disclaimer, the term of this patent is extended or adjusted under 35 U.S.C. 154(b) by 0 days.

(21) Appl. No.: 17/779,605

(22) PCT Filed: Feb. 25, 2022

(86) PCT No.: PCT/CN2022/078038
§ 371 (c)(1),
(2) Date: May 25, 2022

(87) PCT Pub. No.: WO2022/179625
PCT Pub. Date: Sep. 1, 2022

(65) Prior Publication Data
US 2024/0157468 A1 May 16, 2024

(30) Foreign Application Priority Data
Feb. 26, 2021 (CN) .......................... 202110216868.5

(51) Int. Cl.
*B23K 20/26* (2006.01)
*B23K 20/10* (2006.01)
*B23K 31/12* (2006.01)

(52) U.S. Cl.
CPC .............. *B23K 20/26* (2013.01); *B23K 20/10* (2013.01); *B23K 31/12* (2013.01)

(58) Field of Classification Search
CPC .. B23K 20/26; B23K 20/10; B32B 2310/028; B32B 41/00; B29C 65/08–088;
(Continued)

(56) References Cited

U.S. PATENT DOCUMENTS

| 5,411,616 A | 5/1995 | Desai et al. | |
| 6,152,350 A * | 11/2000 | Hayashi | B29C 65/749 228/103 |

FOREIGN PATENT DOCUMENTS

| CN | 203310565 U | * 11/2013 |
| CN | 104155049 A | 11/2014 |

(Continued)

OTHER PUBLICATIONS

Machine translation of CN 203310565 date unknown.*
(Continued)

*Primary Examiner* — John L Goff, II
(74) *Attorney, Agent, or Firm* — Billion & Armitage

(57) ABSTRACT

The present disclosure discloses a pressure detection assembly and an ultrasonic welding device, the pressure detection assembly includes a first connecting piece, a second connecting piece, a detection unit and an elastic member, wherein the first connecting piece is provided with a first guide portion; the second connecting piece is connected to the first connecting piece, and the second connecting piece is provided with a second guide portion matched with the first guide portion; the detection unit is provided between the first connecting piece and the second connecting piece, and the detection unit is configured to collect the pressure value between the first connecting piece and the second connecting piece; and the elastic member is connected between the (Continued)

first connecting piece and the second connecting piece, wherein the elastic member can make the first connecting piece and the second connecting piece clamp the detection unit.

11 Claims, 5 Drawing Sheets

(58) Field of Classification Search
CPC .............. B29C 66/951; B29C 66/9221; B29C 66/92211; B29C 66/92311; B29C 66/92431
USPC .............................. 156/64, 73.1, 378, 580.1
See application file for complete search history.

(56) References Cited

FOREIGN PATENT DOCUMENTS

| | | | |
|---|---|---|---|
| CN | 105922558 | A | 9/2016 |
| CN | 106077942 | A * | 11/2016 ............. B23K 20/12 |
| CN | 107234330 | A | 10/2017 |
| CN | 208628648 | U | 3/2019 |
| CN | 110978529 | A | 4/2020 |
| CN | 111204053 | A | 5/2020 |
| CN | 111331238 | A | 6/2020 |
| CN | 111531260 | A | 8/2020 |
| CN | 211414031 | U | 9/2020 |
| CN | 113021903 | A | 6/2021 |
| DE | 3921653 | A1 | 1/1991 |
| JP | 2004330228 | A * | 11/2004 |

OTHER PUBLICATIONS

Machine translation of CN 106077942 date unknown.*
Office action mailed Aug. 20, 2021 for CN Application No. 202110216868.5.
Office action mailed Oct. 11, 2021 for CN Application No. 202110216868.5.
"International Search Report dated May 20, 2022 with english translation".
"Written Opinion of the International Searching Authority dated May 20, 2022 with english translation".

* cited by examiner

PRESSURE DETECTION ASSEMBLY AND ULTRASONIC WELDING DEVICE

CROSS-REFERENCE TO RELATED APPLICATION

This application is a National Stage Application of PCT/CN2022/078038, filed on Feb. 25, 2022, which claims benefit of application number CN202110216868.5 filed on Feb. 26, 2021 in China and entitled "a pressure detection assembly and an ultrasonic welding device", and which application is incorporated herein by reference. A claim of priority is made.

TECHNICAL FIELD

The present disclosure relates to the technical field of detection units, in particular to a pressure detection assembly and an ultrasonic welding device.

BACKGROUND ART

In the process of welding workpieces using an ultrasonic welding device, it is necessary to strictly control the pressure between the welding head and the workpiece, the pressure between the welding head and the workpiece is generally detected by the pressure detection unit, so as to perform ultrasonic welding under a suitable pressure to ensure welding precision; however, in the process of the existing ultrasonic welding device driving the welding part to descend, since there is a gap between the pressure detection unit and the driving part and between the pressure detection unit and the welding part, fluctuation is easy to occur, which results in deviation of the welding position, and affects the welding precision and welding quality, and simultaneously, the gap is uncontrollable and the gap compensation cannot be performed for each device through the setting program, which is not conducive to mass production.

SUMMARY

The purpose of the present disclosure is to solve at least one of the technical problems existing in the prior art.

To this end, the present disclosure provides a pressure detection assembly, which can eliminate the connection gap between the pressure detection unit, the driving part and the welding part, avoid fluctuation, and effectively improve the welding precision.

The present disclosure also provides an ultrasonic welding device having the above-mentioned pressure detection assembly.

The pressure detection assembly according to the first aspect embodiment of the present disclosure comprises a first connecting piece, provided with a first guide portion; a second connecting piece, connected to the first connecting piece, wherein the second connecting piece is provided with a second guide portion matched with the first guide portion; a detection unit, provided between the first connecting piece and the second connecting piece, wherein the detection unit is configured to collect the pressure value between the first connecting piece and the second connecting piece; and an elastic member, connected between the first connecting piece and the second connecting piece, wherein the elastic member can make the first connecting piece and the second connecting piece clamp the detection unit tightly.

The above-mentioned technical solution at least has the following beneficial effects. Benefited from the pre-tightening force of the elastic member, the first connecting piece and the second connecting piece move close to each other in the guiding direction of the first guide portion and the second guide portion, so that the first connecting piece and the second connecting piece presses tightly the detection unit, so that there is no gap between the first connecting piece and the detection unit and between the second connecting piece and the detection unit, therefore, the detection unit will not generate fluctuations, and the welding position is accurate, thereby effectively improving the welding precision.

According to some embodiments of the present disclosure, the first guide portion is provided as a guide hole, and the second guide portion is provided as a guide post matched with the guide hole.

According to some embodiments of the present disclosure, one end of the guide post is threadedly connected to the second connecting piece, and the other end protrudes from the second connecting piece, which facilitates installation and disassembly to replace damaged components, and may improve production efficiency.

According to some embodiments of the present disclosure, the elastic member is provided as a spring, the protruding end of the guide post is provided with a blocking portion, the spring is sleeved on the guide post, one end of the spring abuts against the first connecting piece, and the other end abuts against the blocking portion, and the spring may drive the second connecting piece to approach the first connecting piece, so as to clamp the detection unit tightly.

According to some embodiments of the present disclosure, the guide hole is provided with a first stepped hole, a diameter of the first stepped hole is matched with an outer diameter of the spring, and the spring is accommodated in the first stepped hole, which can prevent the spring from being displaced to fail, and the structure is compact.

According to some embodiments of the present disclosure, the guide hole is provided with a second stepped hole, a diameter of the second stepped hole is matched with an outer diameter of the blocking portion, and the blocking portion is accommodated in the second stepped hole, so that the overall structure of the pressure detection assembly is more compact.

According to some embodiments of the present disclosure, an elastic sleeve is sleeved over the guide post, and an outer side of the elastic sleeve abuts against an inner wall of the guide hole, which can reduce wear and improve service life.

According to some embodiments of the present disclosure, the first connecting piece is provided with a crimping piece, the crimping piece presses against the detection unit, and the crimping piece and the first connecting piece are detachably connected, which facilitates replacement of the crimping piece that are easy to wear.

According to some embodiments of the present disclosure, the crimping piece and the first connecting piece are threadedly connected with each other, which facilitates disassembly and replacement of the crimping piece.

According to some embodiments of the present disclosure, the first connecting piece is provided with an installation groove, the crimping piece is accommodated in the installation groove, and an end surface of the crimping piece is flush with an end surface of the first connecting piece or the crimping piece at least partially protrudes from the end surface of the first connecting piece.

According to some embodiments of the present disclosure, an inner diameter of the installation groove is larger than an outer diameter of the crimping piece, which can provide an installation space and facilitate the installation of the crimping piece.

According to some embodiments of the present disclosure, the second connecting piece is provided with a positioning groove, the positioning groove is of a shape matched with a shape of the detection unit, and the detection unit is accommodated in the positioning groove, and the detection unit at least partially protrudes from an end surface of the second connecting piece, which can position the detection unit.

An ultrasonic welding device according to second aspect embodiment of the present disclosure includes a machine base, a driving part and a welding part, wherein the machine base is installed with a pressure detection assembly of the above-mentioned first aspect embodiment, and the welding part is slidably connected to the machine base, the driving part is fixedly provided on the machine base, a driving shaft of the driving part is connected to the first connecting piece, and the welding part is connected to the second connecting piece.

The above-mentioned technical solutions have at least the following beneficial effects. After the ultrasonic welding device is installed with the above-mentioned pressure detection assembly, during the welding process, the detection unit will not generate fluctuates, the welding position is accurate, thereby effectively improving welding precision.

The additional aspects and advantages of the present disclosure will be partially given in the following description, and some will become apparent from the following description, or may be learned by practice of the present disclosure.

BRIEF DESCRIPTION OF DRAWINGS

The above and/or additional aspects and advantages of the present disclosure will become apparent and readily understood from the description of embodiments in conjunction with the following accompanying drawings, wherein.

Figure 1:
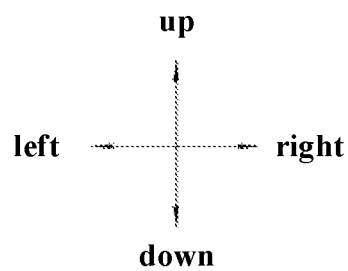
FIG. 1 is a sectional view of a pressure detection assembly in an embodiment of the present disclosure.
Figure 1:
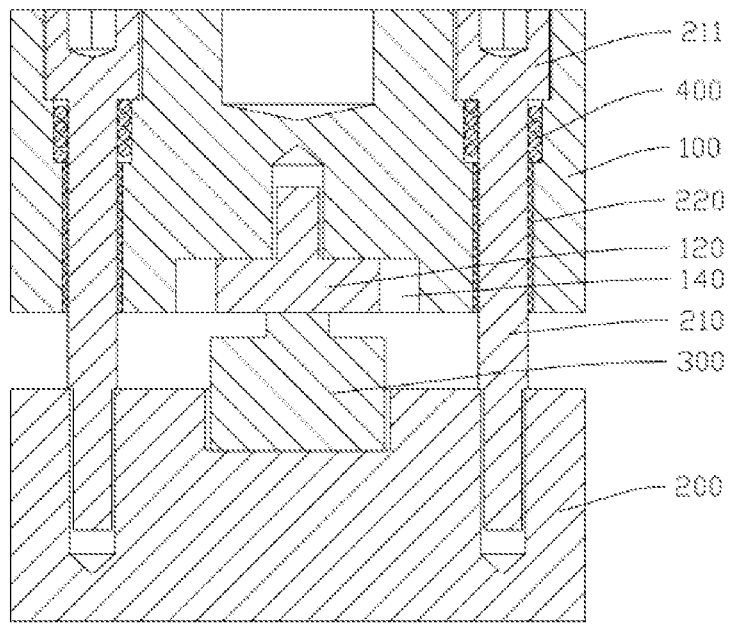

REFERENCE SIGNS ultrasonic welding device 10, machine base 11, driving part 12, welding part 13, and welding base 14;
first connecting piece 100, guide hole 110, first stepped hole 111, second stepped hole 112, crimping piece 120, second external thread 121, second screw hole 130, and installation groove 140;
second connecting piece 200, guide post 210, blocking portion 211, first external thread 212, elastic sleeve 220, positioning groove 230, and first screw hole 240;
detection unit 300; and
elastic member 400.

DETAILED DESCRIPTION OF EMBODIMENTS

This part will describe the specific embodiments of the present disclosure in detail, and the preferred embodiments of the present disclosure are shown in the accompanying drawings, the function of the accompanying drawings is to supplement the description of the text part of the specification with graphics, so that people can intuitively and vividly understand each technical feature and the overall technical solution of the present disclosure, but they should not be construed as limiting the protection scope of the present disclosure.

In the description of the present disclosure, it should be understood that orientation or positional relations indicated by the orientation description referred such as "upper", "lower", "front", "rear", "left", "right" are based on orientation or positional relations as shown in the accompanying drawings, merely for facilitating the description of the present disclosure and simplifying the description, rather than indicating or implying that related devices or elements have to be in the specific orientation, or configured and operated in a specific orientation, therefore, they should not be construed as limitations on the present disclosure.

In the description of the present disclosure, the meaning of several is one or more, the meaning of multiple is two or more, greater than, less than, exceeding and the like are understood as not including this number, and above, below, within and the like are understood as including this number. If it is described that the first and the second are only for the purpose of distinguishing technical features, and it cannot be understood as indicating or implying relative importance, or implying indicating the number of the indicated technical features, or implying indicating the sequence relationship of indicated technical features.

In the description of the present disclosure, unless otherwise definitely limited, the terms "provide", "mount" and "connect" should be understood in a broad sense, and those skilled in the art can reasonably determine the specific meanings of the above words in the present disclosure in combination with the specific content of the technical solution.

Figure 2:
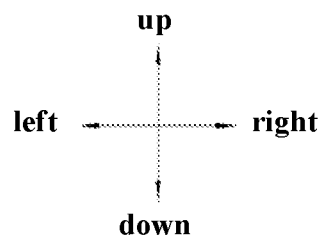
FIG. 2 is a sectional view of a first connecting piece in the embodiment of the present disclosure.
Figure 2:
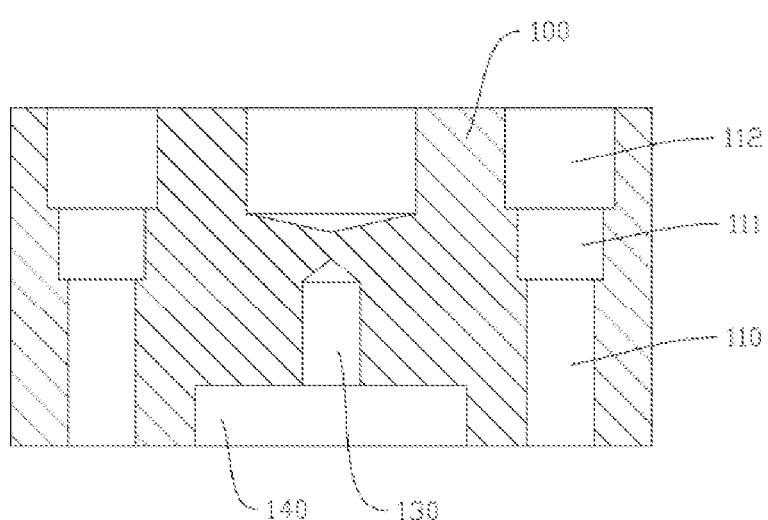
Figure 3:
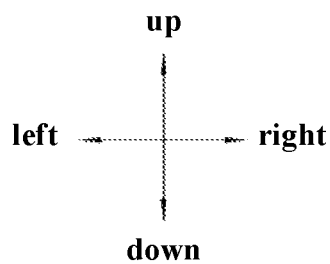
FIG. 3 is a sectional view of a second connecting piece in the embodiment of the present disclosure.
Figure 3:
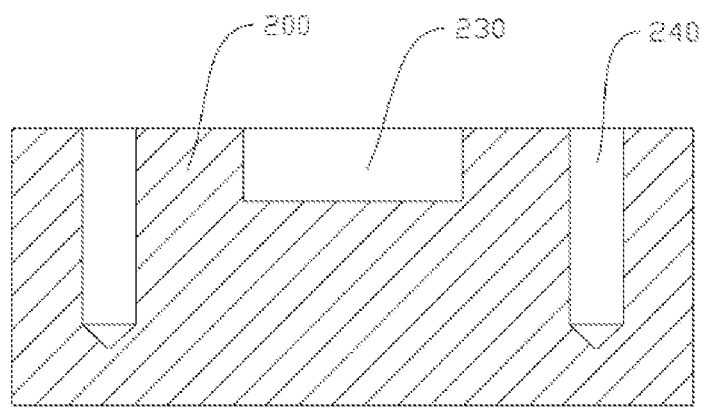

Referring to FIG. 1 to FIG. 3, an embodiment of the present disclosure provides a pressure detection assembly, which comprises a first connecting piece 100 and a second connecting piece 200, wherein the first connecting piece 100 and the second connecting piece 200 are both in a blocky structure, and the first connecting piece 100 is provided above the second connecting piece 200, the first connecting piece 100 is connected to the second connecting piece 200 and the first connecting piece 100 may move relatively to the second connecting piece 200 in an up-and-down direction, a detection unit 300 is provided between the lower end surface of the first connecting piece 100 and the upper end surface of the second connecting piece 200, and the detection unit 300 is a pressure sensor, when the first connecting piece 100 abuts against the second connecting piece 200, the detection unit 300 can collect the pressure value between the first connecting piece 100 and the second connecting piece 200, generally speaking, the upper end of the first connecting piece 100 is connected to the driving part 12, and the lower end of the second connecting piece 200 is connected to the welding part 13, so that the driving part 12 can drive the first connecting piece 100 to move downward and press against the second connecting piece 200 and then drive the welding part 13 to move downward through the second connecting piece 200 to realize the welding of the workpiece, at this time, the pressure detection unit 300 indirectly obtains the pressure between the welding head and the workpiece by obtaining the pressure value between the first connecting piece 100 and the second connecting piece 200, so that the operator adjusts the pressure value during welding according to the actual situation to ensure firm welding.

In this embodiment, the first connecting piece 100 is provided with a first guide portion, the first guide portion is provided as a guide hole 110, the length direction of the guide hole 110 is provided in the up-and-down direction, and the second connecting piece 200 is provided with a second guide portion, the second guide portion is provided as a guide post 210 matched with the guide hole 110, the guide post 210 is provided on the upper end of the second connecting piece 200 and extends upward, the movement of the first connecting piece 100 relative to the second connecting piece 200 in the up-and-down direction is realized through the guiding cooperation of the guide post 210 and the guide hole 110; and two guide holes 110 on the first connecting piece 100 are symmetrically provided in a left-and-right direction, and correspondingly, two guide posts 210 on the second connecting piece 200 are symmetrically provided in the left-and-right direction, through the guiding cooperation of the two sets of guide posts 210 and the guide holes 110, the guiding precision between the first connecting piece 100 and the second connecting piece 200 is higher, and the structural stability is improved; it can be understood that the arrangement positions of the guide hole 110 and the guide post 210 can be interchanged on the first connecting piece 100 and the second connecting piece 200; in addition, the cooperation between the first guide portion and the second guide portion can be provided as the sliding connection cooperation between the slide rail and the sliding block (not shown in the figure), and one of the slide rail and the sliding block is provided on the first connecting piece 100, the other one is provided on the second connecting piece 200, and the length direction of the slide rail is provided in the up-and-down direction, and guiding cooperation between the first connecting piece 100 and the second connecting piece 200 is realized through the sliding connection of sliding block and the slide rail.

An elastic member 400 is connected between the first connecting piece 100 and the second connecting piece 200, generally speaking, the pre-tightening force of the elastic member 400 is greater than the gravity of the welding part 13, the first connecting piece 100 and the second connecting piece 200 move oppositely in the guiding direction of the first guide portion and the second guide portion through the pre-tightening force of the elastic member 400, so that the lower end surface of the first connecting piece 100 is tightly attached to the upper end surface of the detection unit 300, and the upper end surface of the second connecting piece 200 is fitted to the lower end surface of the detection unit 300, that is, there is no gap between the detection unit 300 and the first connecting piece 100, and between the detection unit 300 and the second connecting piece 200, which avoids the problems of welding position deviation and welding precision reduction caused by fluctuations generated due to gap in the process of the driving part 12 driving the welding part 13 to move, and the pressure detection assembly of this embodiment is installed on the ultrasonic welding device 10 to effectively improve the welding precision.

The pressure detection assembly of this embodiment is installed on the ultrasonic welding device 10, the upper end of the first connecting piece 100 is connected to the driving part 12, and the lower end of the second connecting piece 200 is connected to the welding part 13, in a static state, that is, the acting force of the driving part 12 on the first connecting piece 100 is unloaded, since the pre-tightening force of the elastic member 400 is greater than the gravity of the welding part 13, the first connecting piece 100 and the second connecting piece 200 are tightly attached to the detection unit 300, there is no gap between the detection unit 300 and the first connecting piece 100 and between the detection unit 300 and the second connecting piece 200; when the driving part 12 drives the welding part 13 to act downward, the first connecting piece 100 moves downward in the guiding direction of the guide post 210, so that both the first connecting piece 100 and the second connecting piece 200 are tightly attached to the detection unit 300, and no gap between the detection unit 300, the first connecting piece 100 and the second connecting piece 200 exists; and when the driving part 12 drives the welding part 13 to act upward, the first connecting piece 100 moves upward, since the pre-tightening force of the elastic member 400 is greater than the gravity of the welding part 13, the first connecting piece 100 and the second connecting piece 200 are still tightly attached to the detection unit 300, and the gap between the detection unit 300, the first connecting piece 100 and the second connecting piece 200 continues to be zero, therefore, no matter what the situation is, there is no gap between the detection unit 300 and the welding part 13 and between the detection unit 300 and the driving part 12, which can effectively avoid fluctuations generated during welding, prevent welding position deviation, and improve welding precision, and simultaneously, during mass production, the consistency between ultrasonic welding devices 10 is better, and the quality consistency of products is better.

Figure 4:
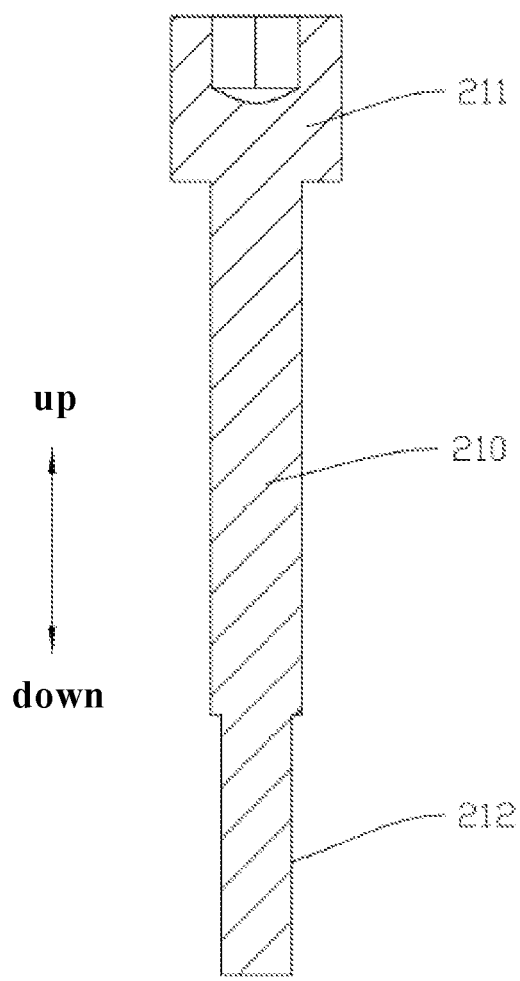
FIG. 4 is a sectional view of a guide post in the embodiment of the present disclosure.

Referring to FIG. 1 in conjunction with FIG. 3 and FIG. 4, in this embodiment, the lower end of the guide post 210 is threadedly connected to the second connecting piece 200, that is, the second connecting piece 200 is provided with a first screw hole 240, and the lower end of the guide post 210 is provided with a first external thread 212 matched with the first screw hole 240, the upper end of the guide post 210 extends upward and protrudes from the second connecting piece 200, during installation, the guide post 210 penetrates through the guide hole 110 of the first connecting piece 100, and is connected to the second connecting piece 200, which is convenient for installation and improves production efficiency, and when disassembling, the guide post 210 can be screwed out, which is convenient for disassembly to replace damaged parts.

Referring to FIG. 1 and FIG. 4, in this embodiment, the elastic member 400 is provided as a spring, the output end of the guide post 210 is provided with a blocking portion 211, the blocking portion 211 is provided as a baffle block or a baffle plate, and the outer diameter of the blocking portion 211 is larger than the outer diameter of the guide post 210, and the outer diameter of the blocking portion 211 is larger than the outer diameter of the spring, during installation, the spring is sleeved over the guide post 210 from the threaded end of the guide post 210, and the guide post 210 penetrates through the guide hole 110 of the first connecting piece 100 and is connected to the second connecting piece 200, generally speaking, the outer diameter of the spring is larger than the diameter of the guide hole 110, the lower end of the spring abuts against the first connecting piece 100, and the upper end of the spring abuts against the blocking portion 211 of the guide post 210. Based on the first connecting piece 100, the spring provides an upward tension to the blocking portion 211, that is, the pre-tightening force of the spring, and the tension of the spring is greater than the sum of the gravities of the welding part 13 and the second connecting piece 200. Therefore, it can provide an upward force to the second connecting piece 200, so that both the second connecting piece 200 and the first connecting piece 100 are tightly attached to the detection unit 300, so as to maintain no gap between the detection unit 300 and the first connecting piece 100 and between the detection unit 300 and the second connecting piece 200, which can effectively avoid the fluctuation problem during the welding process and improve the welding precision. Of course, the elastic member 400 can also be provided as a tension spring (not shown in the figure), and two ends of the tension spring are connected to the first connecting piece 100 and the second connecting piece 200, respectively. Based on the first connecting piece 100, the tension spring provides the second connecting piece 200 with an upward pulling force, so that both the second connecting piece 200 and the first connecting piece 100 can also be tightly attached to the detection unit 300, so as to maintain no gap between the detection unit 300 and the first connecting piece 100 and between the detection unit 300 and the second connecting piece 200. It is understood that the elastic member 400 is not limited to the above-mentioned structural style.

Referring to FIG. 1 and FIG. 2, in this embodiment, the upper end of the guide hole 110 is provided with a first stepped hole 111, the diameter of the first stepped hole 111 is larger than the diameter of the guide hole 110, and the diameter of the first stepped hole 111 is matched with outer diameter of the spring, generally speaking, the depth of the first stepped hole 111 is smaller than the length of the spring in a static state, during installation, the spring is accommodated in the first stepped hole 111, which prevents the spring from protruding to the outer side of the first connecting piece 100 to affect the connection between the driving piece 12 and the first connecting piece 100 and prevents the spring from being displaced to fail, so that the overall structure of the pressure detection assembly is more compact and reliable.

Referring to FIG. 1 and FIG. 2, in this embodiment, the upper end of the guide hole 110, the upper end of the first stepped hole 111, is provided with a second stepped hole 112, and the diameter of the second stepped hole 112 is larger than the diameter of the first stepped hole 111, and the diameter of the second stepped hole 112 is matched with the outer diameter of the blocking portion 211, generally speaking, the depth of the second stepped hole 112 is greater than the height of the blocking portion 211, during installation, the blocking portion 211 is completely accommodated in the second stepped hole 112, which prevents the blocking portion 211 from protruding from the upper end surface of the first connecting piece 100 to affect the connection between the driving part 12 and the first connecting piece 100, so that the overall structure of the pressure detection assembly is more compact.

Referring to FIG. 1, in this embodiment, an elastic sleeve 220 is sleeved over the contact portion of the guide post 210 and the guide hole 110, the inner side of the elastic sleeve 220 is tightly attached to the guide post 210, and the outer side of the elastic sleeve 220 abuts against the inner wall of the guide hole 110, which avoids direct contact between the guide post 210 and the guide hole 110, reduces the wear between the guide post 210 and the first connecting piece 100, and improves the service life.

Figure 5:
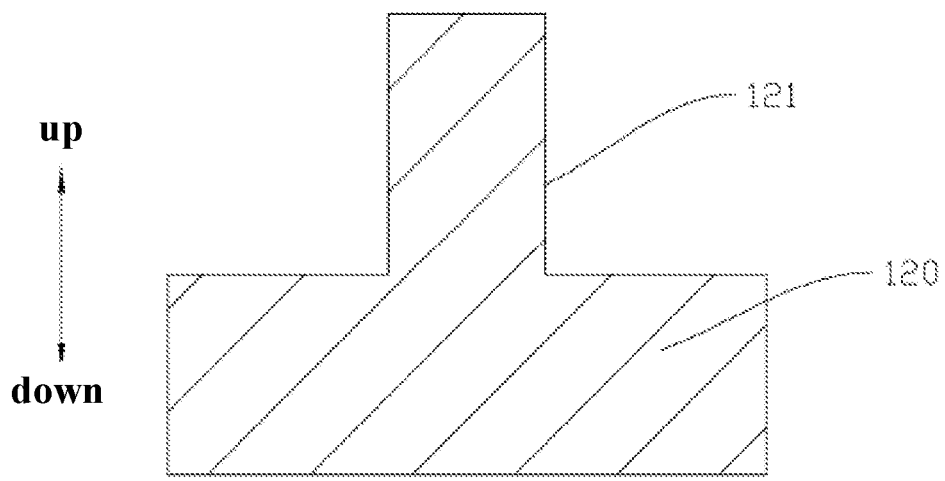
FIG. 5 is a sectional view of a crimping piece in the embodiment of the present disclosure.

Referring to FIG. 1 and FIG. 5, in this embodiment, the lower end surface of the first connecting piece 100 is provided with a crimping piece 120, the crimping piece 120 is provided as a press block structure, and the section of the crimping piece 120 is circular, and the crimping piece 120 and the first connecting piece 100 are detachably connected with each other, specifically, the crimping piece 120 and the first connecting piece 100 are threadedly connected with each other, that is, the first connecting piece 100 is provided with a second screw hole 130, and the upper end of crimping piece 120 is provided with a second external thread 121 matched with the second screw hole 130, after the pressure detection assembly is installed, the first connecting piece 100 is tightly attached to the upper end of the detection unit 300 through the crimping piece 120. During the use of pressure detection assembly, the end surface contacted with the detection unit 300 will inevitably occur wear, the first connecting piece 100 indirectly abuts against the detection unit 300 through the crimping piece 120, which can prevent the first connecting piece 100 from being worn out. Since the first connecting piece 100 is one of the main structures of the pressure detection assembly, the cost of replacing the first connecting piece 100 is higher than the cost of replacing the crimping piece 120, therefore, the maintenance cost in the later period can be effectively reduced. Simultaneously, because the crimping piece 120 is easy to be worn out, connecting with the first connecting piece 100 in a manner of threaded connection can facilitate the replacement of the crimping piece 120 in the future, and the operation is simple and fast. Of course, it can be understood that the crimping piece 120 can also be installed on the bottom of the first connecting piece 100 in a manner of bonding, which is also convenient for replacement. The detachable connection method of the crimping piece 120 is not specifically limited here.

Referring to FIG. 1 and FIG. 2, in this embodiment, the lower end of the first connecting piece 100 is provided with an installation groove 140, and the shape of the installation groove 140 is matched with the shape of the crimping piece 120, that is, the section of the installation groove 140 is also circular, the crimping piece 120 is accommodated in the installation groove 140, and the lower end surface of the crimping piece 120 is flush with the lower end surface of the first connecting piece 100 or the lower end part of the crimping piece 120 protrudes from the lower end surface of the first connecting piece 100, so that the connection structure between the crimping piece 140 and the first connecting piece 100 is more compact, and the crimping piece 140 can effectively abut against the detection unit 300, so that the detection unit 300 can realize the collection of pressure value between the first connecting piece 100 and the second connecting piece 200.

Referring to FIG. 1, in this embodiment, the inner diameter of the installation groove 140 is larger than the outer diameter of the crimping piece 120, that is, there is a certain distance between the inner wall of the installation groove 140 and the outer wall of the crimping piece 120, that is, the installation space of the crimping piece 120 can be provided, which is convenient to screw the second external thread 121 of the crimping piece 120 into the second screw hole 130, and the installation is convenient.

Referring to FIG. 1 and FIG. 3, in this embodiment, the upper end surface of the second connecting piece 200 is provided with a positioning groove 230, the positioning groove 230 is provided as a concave portion, and the shape of the positioning groove 230 is matched with the shape of the detection unit 300, generally speaking, the depth of the positioning groove 230 is less than the height of the detection unit 300, during installation, the detection unit 300 is accommodated in the positioning groove 230, and the upper part of the detection unit 300 protrudes from the upper end surface of the second connecting piece 200. Therefore, it can effectively prevent the detection failure caused by the displacement of the detection unit 300 during the use of the pressure detection assembly, and improve the reliability of the pressure detection assembly.

Figure 6:
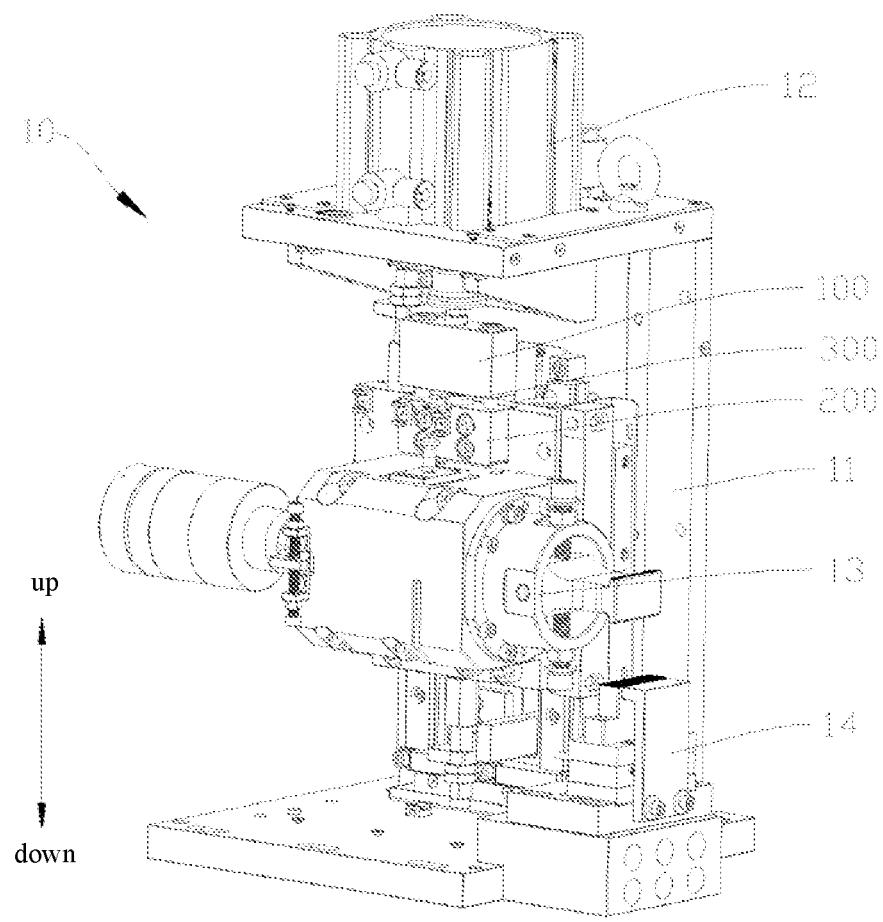
FIG. 6 is a structural schematic view of an ultrasonic welding device in the embodiment of the present disclosure.

Referring to FIG. 6, it is an ultrasonic welding device 10, which comprises a machine base 11, a driving part 12 and a welding part 13, wherein the driving part 12 can be a driving cylinder, and the welding part 13 is a triplet, generally speaking, the bottom end of the machine base 11 is provided with a welding base 14, the welding part 13 is slidably connected to the machine base 11 in the up-and-down direction, and the welding head of the welding part 13 is located directly above the welding base 14, the driving part 12 is fixedly provided above the machine base 11, and the pressure detection assembly is provided between the driving part 12 and the welding part 13. Specifically, the driving shaft of the driving part 12 is connected to the first connecting piece 100, and the welding part 13 is connected to the second connecting piece 200, so that the driving part 12 can drive the welding part 13 to move downward to realize welding, during the welding process, since there is no gap between the detection unit 300, the first connecting piece 100 and the second connecting piece 200 is maintained, no gap between the detection unit 300, the driving part 12 and the welding part 13 is maintained. Therefore, the detection unit 300 will not fluctuate, which can prevent welding position deviation, and improve welding precision, simultaneously, during mass production, the consistency between ultrasonic welding devices 10 is better (all of them has no gap), and the quality consistency of products is better.

The embodiments of the present disclosure have been described in detail above in conjunction with the accompanying drawings, but the present disclosure is not limited to the above-mentioned embodiments, various changes can also be made within the scope of knowledge possessed by those ordinary skilled in the technical field without departing from the spirit of the present disclosure.

What is claimed is:

1. A pressure detection assembly, comprising:
a first connecting piece, provided with a first guide portion;
a second connecting piece, connected to the first connecting piece, wherein the second connecting piece is provided with a second guide portion matched with the first guide portion;
a detection unit, provided between the first connecting piece and the second connecting piece, wherein the detection unit is configured to collect a pressure value between the first connecting piece and the second connecting piece; and
an elastic member, connected between the first connecting piece and the second connecting piece, wherein the elastic member can make the first connecting piece and the second connecting piece clamp the detection unit,
wherein the first guide portion is provided as a guide hole, and the second guide portion is provided as a guide post matched with the guide hole,
the elastic member is provided as a spring, and
the guide hole is provided with a first stepped hole, a diameter of the first stepped hole is matched with an outer diameter of the spring, and the spring is accommodated in the first stepped hole.

2. The pressure detection assembly according to claim 1, wherein the guide post has one end threadedly connected to the second connecting piece, and the other end protruding from the second connecting piece.

3. The pressure detection assembly according to claim 2, wherein a protruding end of the guide post is provided with a blocking portion, the spring is sleeved on the guide post, the spring has one end abutting against the first connecting piece, and the other end abutting against the blocking portion, and the spring can drive the second connecting piece to approach the first connecting piece.

4. The pressure detection assembly according to claim 3, wherein the guide hole is provided with a second stepped hole, a diameter of the second stepped hole is matched with an outer diameter of the blocking portion, and the blocking portion is accommodated in the second stepped hole.

5. The pressure detection assembly according to claim 1, wherein an elastic sleeve is sleeved over the guide post, and an outer side of the elastic sleeve abuts against an inner wall of the guide hole.

6. The pressure detection assembly according to claim 1, wherein the first connecting piece is provided with a crimping piece, wherein the crimping piece presses against the detection unit, and the crimping piece and the first connecting piece are detachably connected to each other.

7. The pressure detection assembly according to claim 6, wherein the crimping piece and the first connecting piece are threadedly connected with each other.

8. The pressure detection assembly according to claim 6, wherein the first connecting piece is provided with an installation groove, the crimping piece is accommodated in the installation groove, and an end surface of the crimping piece is flush with an end surface of the first connecting piece or the crimping piece at least partially protrudes from the end surface of the first connecting piece.

9. The pressure detection assembly according to claim 8, wherein an inner diameter of the installation groove is larger than an outer diameter of the crimping piece.

10. The pressure detection assembly according to claim 1, wherein the second connecting piece is provided with a positioning groove, the positioning groove is of a shape matched with a shape of the detection unit, the detection unit is accommodated in the positioning groove, and the detection unit at least partially protrudes from an end surface of the second connecting piece.

11. A ultrasonic welding device, comprising a machine base, a driving part and a welding part, wherein the machine base is installed with the pressure detection assembly according to claim 1, and the welding part is slidably connected to the machine base, the driving part is fixedly provided on the machine base, a driving shaft of the driving part is connected to the first connecting piece, and the welding part is connected to the second connecting piece.

* * * * *